US012689049B2

(12) United States Patent
Hibino et al.

(10) Patent No.: US 12,689,049 B2
(45) Date of Patent: Jul. 21, 2026

(54) CATALYST DETERIORATION SUPPRESSION DEVICE

(71) Applicant: KABUSHIKI KAISHA TOYOTA CHUO KENKYUSHO, Nagakute (JP)

(72) Inventors: Ryoichi Hibino, Nagakute (JP);
Norihiro Fukaya, Nagakute (JP);
Takao Watanabe, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 944 days.

(21) Appl. No.: 17/916,891

(22) PCT Filed: Apr. 30, 2021

(86) PCT No.: PCT/JP2021/017155
§ 371 (c)(1),
(2) Date: Oct. 4, 2022

(87) PCT Pub. No.: WO2021/256105
PCT Pub. Date: Dec. 23, 2021

(65) Prior Publication Data
US 2023/0163334 A1 May 25, 2023

(30) Foreign Application Priority Data
Jun. 16, 2020 (JP) ................................ 2020-103966

(51) Int. Cl.
*H01M 8/04992* (2016.01)
*H01M 8/04492* (2016.01)
(Continued)

(52) U.S. Cl.
CPC ... *H01M 8/04992* (2013.01); *H01M 8/04492* (2013.01); *H01M 8/04537* (2013.01); *H01M 8/04873* (2013.01)

(58) Field of Classification Search
CPC ... H01M 8/04; H01M 8/04298–04313; H01M 8/0432–04335; H01M 8/04365;
(Continued)

(56) References Cited

U.S. PATENT DOCUMENTS

| | | | | |
|---|---|---|---|---|
| 2007/0248848 A1* | 10/2007 | Marsh | ................... | H01M 8/241 |
| | | | | 429/492 |
| 2010/0068576 A1* | 3/2010 | Hamada | ............ | H01M 8/04589 |
| | | | | 429/444 |

FOREIGN PATENT DOCUMENTS

| | | | | |
|---|---|---|---|---|
| EP | 3920290 A1 * | 12/2021 | ............ | H02M 3/156 |
| JP | 2010-021072 A | 1/2010 | | |

(Continued)

OTHER PUBLICATIONS

Cha, S (2016). Fuel cell Fundamentals. (3rd ed.) (pp. 272-294, 346, 431-449). (Year: 2016).*

(Continued)

*Primary Examiner* — Nicole M. Buie-Hatcher
*Assistant Examiner* — Jacob Buchanan
(74) *Attorney, Agent, or Firm* — Oliff PLC

(57) ABSTRACT

A catalyst deterioration suppression device includes: a first device obtaining a fuel cell voltage V (=catalyst voltage $V_{cat}$) as a variable to estimate a response speed (time constant $\tau$) at which a coverage ratio of an oxide film of catalyst particles contained in a fuel cell cathode changes; a second device reading out a time constant $\tau_t$ corresponding to the voltage V at a current time t from a pre-made map A representing a relationship between the voltage V and the time constant $\tau$ and corresponding to the catalyst particles; a third device generating a continuous-time type dynamic filter $F(s, \tau)$ by using the time constant $\tau_t$ and converting the continuous-time type dynamic filter $F(s, \tau)$ to a discrete-time type dynamic filter $F(z, \tau)$; and a fourth device inputting a
(Continued)

target voltage Vr to the discrete-time type dynamic filter F(z, τ) and outputting a corrected target voltage $V_{r-fil}$.

7 Claims, 9 Drawing Sheets

(51) Int. Cl.
H01M 8/04537 (2016.01)
H01M 8/04858 (2016.01)

(58) Field of Classification Search
CPC ......................... H01M 8/04492–04507; H01M 8/04537–04589; H01M 8/04574–04589; H01M 8/04604–04619; H01M 8/04634–04649; H01M 8/04664–04679; H01M 8/04694; H01M 8/04858–0488; H01M 8/04895–0491; H01M 8/04925–0494; H01M 8/04992
See application file for complete search history.

(56) References Cited

FOREIGN PATENT DOCUMENTS

| JP | 2010-67434 A | 3/2010 | |
| JP | 2011-192458 A | 9/2011 | |
| JP | 2012-129069 A | 7/2012 | |
| JP | 2013-101774 A | 5/2013 | |
| JP | 2017-084451 A | 5/2017 | |
| WO | WO-2020155018 A1 * | 8/2020 | ............ H02M 3/156 |

OTHER PUBLICATIONS

Feb. 7, 2025 extended Search Report issued in European Patent Application No. 21826072.7.

Darling, Robert M. et al., "Kinetic Model of Platinum Dissolution in PEMFCs", Journal of the Electrochemical Society, vol. 150, No. 11, 2003.

Jul. 27, 2021 International Search Report issued in International Patent Application No. PCT/JP2021/017155.

Jul. 27, 2021 Writtten Opinion issued in International Patent Application No. PCT/JP2021/017155.

Sep. 20, 2022 Office Action issued in Japanese Patent Application No. 2020-208243.

Oct. 26, 2021 International Search Report issued in International Patent Application No. PCT/JP2021/034517.

Oct. 26, 2021 Written Opinion of the International Searching Authority issued in International Patent Application No. PCT/JP2021/034517.

U.S. Appl. No. 18/030,601, filed Apr. 6, 2023 in the name of Norihiro Fukaya et al.

* cited by examiner

TRANSFER CHARACTERISTIC MODEL

EXPRESSION(2)

FIG. 11

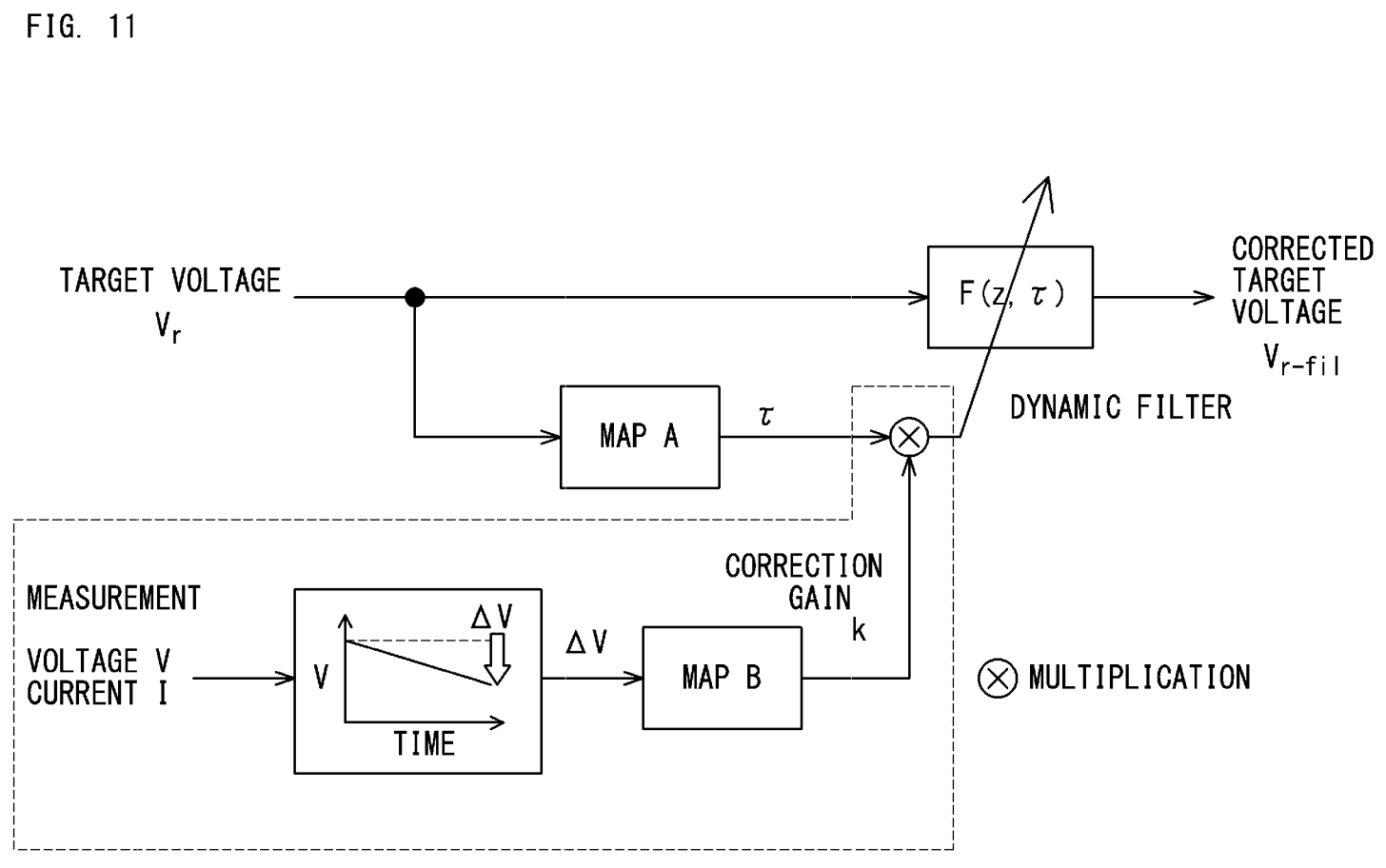

TARGET VOLTAGE $V_r$

CORRECTED TARGET VOLTAGE $V_{r-fil}$ $F(z, \tau)$

DYNAMIC FILTER $\tau$

MAP A $\otimes$ MULTIPLICATION

CORRECTION GAIN $k$

MAP B $\Delta V$ $V$ $\Delta V$

TIME

MEASUREMENT VOLTAGE V CURRENT I

FIG. 12

CATALYST DETERIORATION SUPPRESSION DEVICE

FIELD OF THE INVENTION

The present invention relates to a catalyst deterioration suppression device, more specifically, a catalyst deterioration suppression device for suppressing the deterioration of catalyst particles on a cathode side in a transient state where a voltage changes rapidly.

BACKGROUND OF THE INVENTION

A polymer electrolyte fuel cell has membrane electrode assemblies (MEAs) in which electrodes including catalysts are bonded over both surfaces of an electrolyte membrane. Each of the electrodes usually has a two-layer structure of a catalyst layer including a catalyst and a gas diffusion layer. The gas diffusion layer is for supplying a reaction gas and electrons to the catalyst layer and carbon paper, carbon cloth, etc. are used. Further, the catalyst layer is a part that serves as a reaction field for electrode reaction, and generally includes a composite of carbon carrying catalyst particles such as platinum and a solid polymer electrolyte (catalyst layer ionomer).

Current collectors (also referred to as separators) having gas flow paths are further placed over both surfaces of the MEA. A polymer electrolyte fuel cell usually has a structure (fuel cell stack) in which multiple unit cells including MEAs and current collectors are stacked.

In a polymer electrolyte fuel cell, the dissolution rate of catalyst particles on the cathode side increases as a voltage increases. In contrast, when a voltage increases, the surfaces of the catalyst particles on the cathode side are covered with oxide films and hence the dissolution of the catalyst particles is suppressed. When a voltage increases rapidly, however, the oxide films are formed belatedly and hence the elution of the catalyst particles advances gradually when rapid voltage fluctuations are repeated.

Eluted catalyst components precipitate as fine particles in an electrolyte membrane or precipitate over the surfaces of other catalyst particles existing in a catalyst layer and coarsen the catalyst particles. The elution of the catalyst components outside a catalyst layer and/or the coarsening of the catalyst particles cause/causes fuel cell performance to deteriorate. Further, such deterioration of a catalyst can also occur in a fuel cell other than a polymer electrolyte fuel cell.

Then, various proposals have heretofore been made in order to solve the problem.

For example, Patent Literature 1 discloses a fuel cell operating method of, in the case where a target voltage of a fuel cell is higher than a voltage before fluctuation and is equal to or higher than a dissolution start voltage at which a catalyst may possibly dissolve, (a) increasing a voltage to a first stage rising voltage that is a voltage at which a catalyst is covered with a protective film or higher and (b) increasing the voltage to the target voltage after a predetermined time has elapsed since the voltage reaches the first stage rising voltage.

The literature describes that a catalyst metal can be inhibited from deteriorating by controlling the operation of a fuel cell so that the voltage may reach a target voltage after waiting for a protective film to form over a catalyst when the catalyst may possibly dissolve.

When the method described in Patent Literature 1 is used, the elution of catalyst particles and the deterioration of fuel cell performance caused by the elution can be suppressed to some extent. In an actual situation, however, power demands from a driver vary and hence the power of a fuel cell also changes variously. By such a method of merely raising a voltage to a target voltage after a predetermined time has elapsed as described in Patent Literature 1 therefore, it is difficult to make them compatible to inhibit a catalyst from deteriorating and to meet variously changing power demands from drivers.

Further, a deterioration rate of catalyst particles varies in accordance with not only a voltage of a fuel cell but also a type of catalyst particles, a deterioration state of catalyst particles, usage environments (temperature, humidity) of catalyst particles, and others. A method of suppressing the deterioration of catalyst particles in consideration of these points, however, has never been proposed.

CITATION LIST

Patent Literature

[Patent Literature 1] Japanese Unexamined Patent Application Publication No. 2010-067434

SUMMARY OF THE INVENTION

A problem to be solved by the present invention is to provide a catalyst deterioration suppression device that can suppress the deterioration of catalyst particles on a cathode side in a transient state where a voltage changes rapidly.

Another problem to be solved by the present invention is to provide a catalyst deterioration suppression device that can suppress the deterioration of catalyst particles on a cathode side even when a type of catalyst particles, a deterioration state of catalyst particles, or a usage environment of catalyst particles is different.

In order to solve the above problem, a catalyst deterioration suppression device according to the present invention includes:

first means for obtaining a voltage V (=catalyst voltage $V_{cat}$) of a fuel cell as a variable to estimate a response speed (time constant $\tau$) at which a coverage ratio of an oxide film of catalyst particles contained in a cathode of the fuel cell changes;

second means for reading out a time constant $\tau_t$ corresponding to the voltage V at a current time t from a pre-made map A representing a relationship between the voltage V and the time constant $\tau$ and corresponding to the catalyst particles;

third means for generating a continuous-time type dynamic filter $F(s, \tau)$ by using the time constant $\tau_t$, and converting the continuous-time type dynamic filter $F(s, \tau)$ to a discrete-time type dynamic filter $F(z, \tau)$; and fourth means for inputting a target voltage $V_r$ to the discrete-time type dynamic filter $F(z, \tau)$ and outputting a corrected target voltage $V_{r\text{-}fil}$.

In a fuel cell, the dissolution rate of catalyst particles on the cathode side increases as a voltage increases. In contrast, when a voltage increases, the surfaces of the catalyst particles on the cathode side are covered with oxide films and hence the dissolution of the catalyst particles is suppressed. When a voltage increases rapidly, however, the oxide films are formed belatedly and hence the elution of the catalyst particles advances. On this occasion, a response speed (namely, a dissolution rate of catalyst particles) at which a coverage ratio of oxide films of catalyst particles changes mainly depends on the magnitude of a voltage V of a fuel cell and the magnitude of a change rate of the voltage V.

On the other hand, the elution of catalyst particles caused by a belatedly formed oxide film can be suppressed by:

(a) reading out a time constant $\tau_t$ corresponding to a voltage V at a current time t from a pre-made map A representing a relationship between a voltage V and a response speed (time constant $\tau$) and corresponding to catalyst particles used in a fuel cell;

(b) generating a continuous-time type dynamic filter F(s, $\tau$) by using $\tau_t$; and further (c) correcting the voltage V by using F(s, $\tau$) (in other words, make an actual voltage change rate slower than a required voltage change rate).

Further, a time constant $\tau$ depends on not only a voltage V but also a voltage decrement $\Delta V$ (namely, the degree of deterioration of catalyst particles), a temperature T of a fuel cell, and humidities RH of gases supplied respectively to a cathode and an anode. The elution of catalyst particles therefore can be suppressed further by making respective maps corresponding to those variables in advance, reading out a correction gain corresponding to each of those variables from among the maps, and correcting a time constant $\tau$ by using the read-out correction gain.

BRIEF DESCRIPTION OF THE DRAWINGS

FIG. 11 is a schematic diagram of a method for handling catalyst deterioration.

FIG. 12 is a schematic diagram of a method for handling temperature change and/or humidity change.

DETAILED DESCRIPTION OF THE PREFERRED EMBODIMENTS

Figure 1:
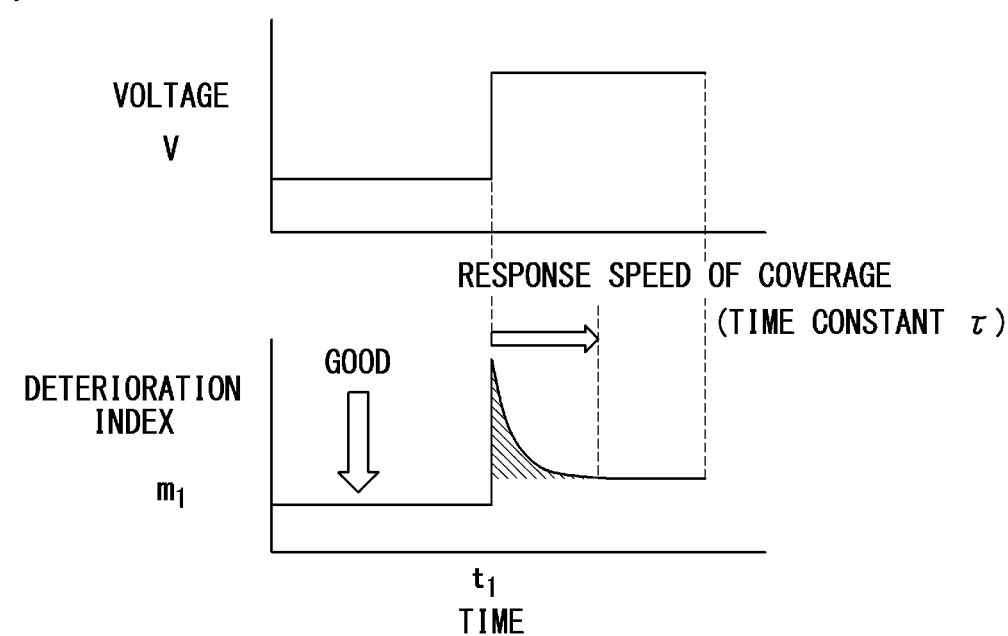
FIG. 1 is a schematic diagram of the change over time in a deterioration index $m_1$ of catalyst particles when a voltage V changes stepwise.

An embodiment according to the present invention is explained hereunder in detail.

1. CATALYST DETERIORATION SUPPRESSION DEVICE

A catalyst deterioration suppression device according to the present invention includes:

first means for obtaining a voltage V (=catalyst voltage $V_{cat}$) of a fuel cell as a variable to estimate a response speed (time constant $\tau$) at which a coverage ratio of an oxide film of catalyst particles contained in a cathode of the fuel cell changes;

second means for reading out a time constant $\tau_t$ corresponding to the voltage V at a current time t from a pre-made map A representing a relationship between the voltage V and the time constant $\tau$ and corresponding to the catalyst particles;

third means for generating a continuous-time type dynamic filter F(s, $\tau$) by using the time constant $\tau_t$, and converting the continuous-time type dynamic filter F(s, $\tau$) to a discrete-time type dynamic filter F(z, $\tau$); and fourth means for inputting a target voltage $V_r$ to the discrete-time type dynamic filter F(z, $\tau$) and outputting a corrected target voltage $V_{r\text{-}fil}$.

[1.1. Application Object]

A catalyst deterioration suppression device according to the present invention is applicable to any fuel cell that may possibly cause catalyst deterioration when voltage fluctuations occur. Fuel cells to which the present invention is applied are a polymer electrolyte fuel cell, a phosphate fuel cell, a solid oxide fuel cell, a molten carbonate fuel cell, and an alkaline fuel cell, for example.

The composition of catalyst particles is not particularly limited and an optimum composition can be selected in accordance with a purpose. Examples of catalyst particles in the case of a polymer electrolyte fuel cell are:

(a) precious metals (Pt, Au, Ag, Pd, Rh, Ir, Ru, and Os);

(b) an alloy containing two or more precious metal elements; and (c) an alloy containing one or more kinds of precious metal elements and one or more kinds of base metal elements (for example, Fe, Co, Ni, Cr, V, and Ti).

[1.2. First Means]

The first means includes means for obtaining a voltage V (=catalyst voltage $V_{cat}$) of a fuel cell as a variable to estimate a response speed (time constant $\tau$) at which a coverage ratio of an oxide film of catalyst particles contained in a cathode of the fuel cell changes.

The first means may further include, as a variable to estimate a response speed (time constant $\tau$):

(a) means for obtaining a voltage decrement $\Delta V$;

(b) means for obtaining a temperature T of a fuel cell; and/or (c) means for obtaining humidities RH of gasses supplied respectively to a cathode and an anode.

[1.2.1. Obtainment of Voltage V]

A dissolution rate of catalyst particles changes mainly in accordance with a magnitude of a voltage V in a fuel cell and a magnitude of a change rate of a voltage V. In order to suppress the deterioration of catalyst particles therefore, the first means must have at least means for obtaining a voltage V in a fuel cell as a variable to estimate $\tau$.

A fuel cell generally includes a unit cell that has a membrane electrode assembly (MEA) in which electrodes are bonded over both surfaces of an electrolyte membrane and current collectors that are arranged over both surfaces of the MEA.

In the present invention, a "voltage V" means a catalyst voltage $V_{cat}$ unless otherwise specified.

A "catalyst voltage $V_{cat}$" means a potential difference between a reference electrode installed at a cathode side catalyst layer and a cathode side current collector in a unit cell. An "interterminal voltage $V_{cell}$" means a potential difference between a cathode side current collector and an anode side current collector in a unit cell. When a current flowing in a unit cell is defined as I and a resistance of a unit cell is defined as R, a relational expression of $V(V_{cat})=V_{cell}+IR$ is established.

It is preferable to use an actually measured $V_{cat}$ as a voltage V for estimating $\tau$. This is because $\tau$ is a parameter related to $V_{cat}$. When $V_{cell}$ is actually measured, it is necessary to estimate $V_{cat}$ from $V_{cell}$ and an estimation error may occur on that occasion, as it will be described later.

Examples of means for actually measuring or estimating a voltage V (namely, a catalyst voltage $V_{cat}$) are:

(a) means A for obtaining an interterminal voltage $V_{cell}$, a current I, and a resistance value R of a fuel cell and calculating the voltage V from the relational expression $V=V_{cell}+IR$;

(b) means B for obtaining $V_{cell}$, substituting $V_{cell}$ in a previously obtained relational expression $V=f(V_{cell})$ between $V_{cell}$ and the voltage V, and estimating the voltage V; and (c) means C for installing a reference electrode at a cathode side catalyst layer in a fuel cell in advance and actually measuring the voltage V by using a potential difference between the reference electrode and a cathode side current collector.

In the case of the means A, a current I and a resistance value R are required to be obtained other than an interterminal voltage $V_{cell}$. Generally, since current collectors are exposed over the outer surfaces of a fuel cell stack, $V_{cell}$ can be obtained relatively easily. I can be obtained when $V_{cell}$ is obtained. R can be obtained by impedance measurement. The means A is easy and convenient and has an advantage of a relatively high estimation accuracy because the voltage V is estimated by using $V_{cell}$, I, and R, which are relatively easily measured.

In the case of the means B, only an interterminal voltage $V_{cell}$ is obtained and a voltage V is estimated from a previously obtained relational expression between $V_{cell}$ and the voltage V. The means B is inferior to the means A in the estimation accuracy of the voltage V but can estimate the voltage V more simply and conveniently than the means A.

In the case of the means C, a voltage V is actually measured by using a reference electrode. The means C can obtain a voltage V more accurate than the means A but has a disadvantage that the structure of a fuel cell is complicated.

[1.2.2. Obtainment of Voltage Decrement $\Delta V$]

The first means may further include means for obtaining a voltage decrement $\Delta V$ (namely, a voltage decrement $\Delta V_{cat}$ of a catalyst voltage $V_{cat}$) as a variable to estimate $\tau$.

Here, a "voltage decrement $\Delta V$" means a difference between an initial state voltage $V_0$ and a voltage $V_t$ after used for t hours $(=V_t-V_0)$ at a reference current $I_0$. The reference current $I_0$ is not particularly limited and an optimum value can be selected in accordance with a purpose.

Power demands to a fuel cell are various and hence a current I sometimes becomes a reference current $I_0$ instantaneously during normal operation. Change of $\Delta V$ over time can be obtained by sequentially memorizing the voltage V on that occasion.

$\Delta V$ is an index representing a degree of deterioration of catalyst particles. If sudden voltage fluctuations are repeated during the operation of a fuel cell, a phenomenon of catalyst particles having smaller particle sizes eluting preferentially and precipitating over the surfaces of catalyst particles having larger particle sizes (namely, a phenomenon of coarsening catalyst particles) occurs. If such a phenomenon occurs, a voltage V at a reference current $I_0$ lowers. As a result, $\tau$ changes even when the voltage V is unchanged. If $\tau$ is estimated by using only a voltage V therefore, the estimation accuracy of $\tau$ may lower in some cases. In contrast, the deterioration of catalyst particles can be suppressed further by obtaining a voltage decrement $\Delta V$ in addition to a voltage V and correcting $\tau$ in accordance with $\Delta V$.

[1.2.3. Obtainment of Temperature T]

The first means may further include means for obtaining a temperature T of a fuel cell as a variable to estimate $\tau$.

The temperature of a fuel cell varies in accordance with a usage environment and power demand of the fuel cell. Meanwhile, each of the elution reaction of catalyst particles and the formation reaction of an oxide film is a chemical reaction and hence the reaction rate depends on a temperature T. If $\tau$ is estimated only with a voltage V therefore, the estimation accuracy of $\tau$ may sometimes lower. In contrast, the deterioration of catalyst particles can be suppressed further by further obtaining a temperature T in addition to a voltage V and correcting $\tau$ in accordance with T.

[1.2.4. Obtainment of Humidity RH]

The first means may further include means for obtaining humidities RH of gasses supplied respectively to a cathode and an anode as variables to estimate $\tau$.

For example, Pt fine particles are used for a cathode catalyst in a polymer electrolyte fuel cell, but the Pt fine particles may sometimes coarsen while they are used. Water is required for advancing the reaction and hence the reaction rate depends on a humidity RH. If $\tau$ is estimated only with a voltage V therefore, the estimation accuracy of $\tau$ may sometimes lower. In contrast, the deterioration of catalyst particles can be suppressed further by further obtaining a humidity RH in addition to a voltage V and correcting $\tau$ in accordance with RH.

[1.3. Second Means]

The second means includes means for reading out a time constant $\tau$ (this is also referred to as a "time constant $\tau_t$" hereinafter) corresponding to a voltage V (this is also referred to as a "voltage $V_t$" hereinafter) at a current time t from a pre-made map A representing a relationship between a voltage V and a time constant $\tau$ and corresponding to the catalyst particles.

The second means may be means that further includes:

(a) means for reading out a correction gain k (this is also referred to as a "correction gain $k_t$" hereinafter) corresponding to a voltage decrement $\Delta V$ (this is also referred to as a "voltage decrement $\Delta V_t$" hereinafter) at a current time t from a pre-made map B representing a relationship between the voltage decrement $\Delta V$ and the correction gain k of the time constant $\tau$ and corresponding to the catalyst particles and multiplying the time constant $\tau$ by the correction gain $k_t$;

(b) means for reading out a correction gain p (this is also referred to as a "correction gain $p_t$" hereinafter) corresponding to a temperature T (this is also referred to as a "temperature $T_t$" hereinafter) at a current time t from a pre-made map C representing a relationship between the temperature T and the correction gain p of the time constant $\tau$ and corresponding to the catalyst particles and multiplying the time constant $\tau$ by the correction gain $p_t$; and/or (c) means for reading out a correction gain r (this is also referred to as a "correction gain $r_t$" hereinafter) corresponding to a humidity RH (this is also referred to as a "humidity $RH_t$" hereinafter) at a current time t from a pre-made map D representing a relationship between the humidity RH and the correction gain r of the time constant $\tau$ and corresponding to the catalyst particles and multiplying the time constant $\tau$ by the correction gain $r_t$.

[1.3.1. Read-Out of Time Constant $\tau_t$]

When the degree of deterioration and usage conditions of catalyst particles are the same, a time constant $\tau$ at a certain voltage V depends on the composition of the catalyst particles. A map A representing a relationship between V and $\tau$ therefore is made for each composition of catalyst particles beforehand and is stored in a memory.

In the memory, only a map A corresponding to one kind of catalyst particles may be stored or multiple maps A corresponding to two or more kinds of catalyst particles may be stored. When multiple maps A are stored in a memory, a specific map A corresponding to catalyst particles used in a fuel cell is selected from among the multiple maps A.

Successively, when $V_t$ is obtained by the first means, $\tau_t$ corresponding to $V_t$ is read out from a map A. When $\tau_t$ corresponding to $V_t$ does not exist in the map A, linear interpolation may be applied by using multiple time constants $\tau_t$ corresponding to multiple voltages V existing in the vicinity of $V_t$. The read-out $\tau_t$ is used for generating a dynamic filter F(s, $\tau$) in the third means which will be described later.

[1.3.2. Correction of $\tau$ by Voltage Decrement $\Delta$V]

The reaction rate of deterioration reaction of catalyst particles depends also on a voltage decrement $\Delta$V (degree of deterioration of catalyst particles) and a time constant $\tau$ also changes in response to this. If the degree of the change of $\tau$ on that occasion is defined as a correction gain k, k also depends on the composition of catalyst particles. It is therefore desirable to make a map B representing a relationship between $\Delta$V and k for each composition of catalyst particles beforehand and store it in a memory.

In the memory, only a map B corresponding to one kind of catalyst particles may be stored or multiple maps B corresponding to two or more kinds of catalyst particles may be stored. When multiple maps B are stored in a memory, a specific map B corresponding to catalyst particles used in a fuel cell is selected from among the multiple maps B.

Successively, when $\Delta V_t$ is obtained by the first means, $k_t$ is read out from a map B. When $k_t$ corresponding to $\Delta V_t$ does not exist in the map B, linear interpolation may be applied by using multiple correction gains $k_t$ corresponding to multiple voltage decrements $\Delta$V existing in the vicinity of $\Delta V_t$. When $k_t$ is read out, $\tau$ (including $\tau$ corrected by $p_t$ and/or $r_t$ that will be described later) is multiplied by $k_t$. $\tau$ corrected by $k_t$ (=$k_t \times \tau$) is used for generating a dynamic filter F(s, $\tau$) in the third means which will be described later.

[1.3.3. Correction of $\tau$ by Temperature T]

The reaction rate of deterioration reaction of catalyst particles depends also on a temperature T and a time constant $\tau$ also changes in response to this. If the degree of the change of $\tau$ on that occasion is defined as a correction gain p, p also depends on the composition of catalyst particles. It is therefore desirable to make a map C representing a relationship between T and p for each composition of catalyst particles beforehand and store it in a memory.

In the memory, only a map C corresponding to one kind of catalyst particles may be stored or multiple maps C corresponding to two or more kinds of catalyst particles may be stored. When multiple maps C are stored in a memory, a specific map C corresponding to catalyst particles used in a fuel cell is selected from among the multiple maps C.

Successively, when $T_t$ is obtained by the first means, $p_t$ corresponding to $T_t$ is read out from a map C. When $p_t$ corresponding to $T_t$ does not exist in the map C, linear interpolation may be applied by using multiple correction gains $p_t$ corresponding to multiple temperatures T existing in the vicinity of $T_t$. When $p_t$ is read out, $\tau$ (including $\tau$ corrected by $k_t$ and/or $r_t$ that will be described later) is multiplied by $p_t$. $\tau$ corrected by $p_t$ (=$p_t \times \tau$) is used for generating a dynamic filter F(s, $\tau$) in the third means which will be described later.

[1.3.4. Correction of $\tau$ by RH]

The reaction rate of deterioration reaction of catalyst particles depends also on a humidity RH and a time constant $\tau$ also changes in response to this. If the degree of the change of $\tau$ on that occasion is defined as a correction gain r, r also depends on the composition of catalyst particles. It is therefore desirable to make a map D representing a relationship between RH and r for each composition of catalyst particles beforehand and store it in a memory.

In the memory, only a map D corresponding to one kind of catalyst particles may be stored or multiple maps D corresponding to two or more kinds of catalyst particles may be stored. When multiple maps D are stored in a memory, a specific map D corresponding to catalyst particles used in a fuel cell is selected from among the multiple maps D.

Successively, when $RH_t$ is obtained by the first means, $r_t$ corresponding to $RH_t$ is read out from a map D. When $r_t$ corresponding to $RH_t$ does not exist in the map D, linear interpolation may be applied by using multiple correction gains $r_t$ corresponding to multiple humidities RH existing in the vicinity of $RH_t$. When $r_t$ is read out, $\tau$ (including $\tau$ corrected by $k_t$ and/or $p_t$) is multiplied by $r_t$. $\tau$ corrected by $r_t$ (=$r_t \times \tau$) is used for generating a dynamic filter F(s, $\tau$) in the third means which will be described later.

[1.4. Third Means]

The third means includes means for generating a continuous-time type dynamic filter F(s, $\tau$) by using the time constant $\tau_t$, and converting the continuous-time type dynamic filter F(s, $\tau$) to a discrete-time type dynamic filter F(z, $\tau$).

The third means may be means that further includes:

(a) means for generating a continuous-time type dynamic filter F(s, $\tau$) by using a time constant $\tau$ corrected by a correction gain $k_t$, and converting the continuous-time type dynamic filter F(s, $\tau$) to a discrete-time type dynamic filter F(z, $\tau$);

(b) means for generating a continuous-time type dynamic filter F(s, $\tau$) by using a time constant $\tau$ corrected by a correction gain $p_t$, and converting the continuous-time type dynamic filter F(s, $\tau$) to a discrete-time type dynamic filter F(z, $\tau$); and/or (c) means for generating a continuous-time type dynamic filter F(s, $\tau$) by using a time constant $\tau$ corrected by a correction gain $r_t$, and converting the continuous-time type dynamic filter F(s, $\tau$) to a discrete-time type dynamic filter F(z, $\tau$)).

When a voltage V changes suddenly, the dissolution rate of catalyst particles increases transiently (overshoots). A dynamic filter F(s, $\tau$) has to be able to compensate such transient increase of a dissolution rate by using $\tau$ (including $\tau$ corrected by at least one of the correction gains of $k_t$, $p_t$, and $r_t$). The dynamic filter F(s, $\tau$) is not particularly limited as long as it exhibits such functions.

An example of such a dynamic filter F(s, $\tau$) is represented by the following expression (4) or (6). The details of the expressions (4) and (6) will be described later.

$$F(s,\tau) = (\tau \cdot s + 1)/(2\tau \cdot s + 1) \tag{4}$$

Here, s is a Laplacian operator.

$$F(s,\tau) = G_m(s)/G(s,\tau) \tag{6}$$

Here, $G_m(s)$ is a transfer function of an ideal response model and $G(s, \tau)$ is a transfer function of a model.

Further, the continuous-time type dynamic filter $F(s, \tau)$ is converted to a discrete-time type dynamic filter $F(z, \tau)$. A method for converting $F(s, \tau)$ to $F(z, \tau)$ is not particularly limited and a publicly known method can be used. An example of a method for converting $F(s, \tau)$ to $F(z, \tau)$ will be described later.

[1.5. Fourth Means]

The fourth means includes means for inputting a target voltage $V_r$ to $F(z, \tau)$ and outputting a corrected target voltage $V_{r-fil}$. The corrected target voltage $V_{r-fil}$ is sent to an actuator controller and a control object is controlled by the controller.

2. EXAMPLES

An example of a catalyst deterioration suppression device according to the present invention is explained hereinafter.

[2.1. Target Catalyst Deterioration]

FIG. 1 shows a schematic diagram of the change over time in a deterioration index $m_1$ of catalyst particles when a voltage V changes stepwise. Catalyst particles have such a deterioration characteristic as shown in FIG. 1. The upper row in FIG. 1 shows an example in which a voltage V of a fuel cell (namely, a catalyst voltage $V_{cat}$) increases stepwise. The lower row in FIG. 1 shows a state where a deterioration index $m_1$ that represents a deterioration degree of catalyst particles changes over time as a result of inputting the voltage V of the upper row.

A "deterioration index $m_1$" means a degree to which performance of catalyst particles (for example, platinum particles) used in a fuel cell deteriorates over time. In the present invention, the deterioration index is a dissolution rate of catalyst particles. A dissolution rate is represented by the following expression (1).

$$m_1 = F(V) \times (1 - \theta(V, t)) \tag{1}$$

Here, $m_1$ is a deterioration index (dissolution rate), $F(V)$ is a dissolution rate of a catalyst depending on a voltage V, $\theta$ is a coverage ratio (ratio of an area of an oxide film covering the surfaces of catalyst particles to the surface area of the catalyst particles, $\theta=0$ to 1), and t is a time.

Figure 2:
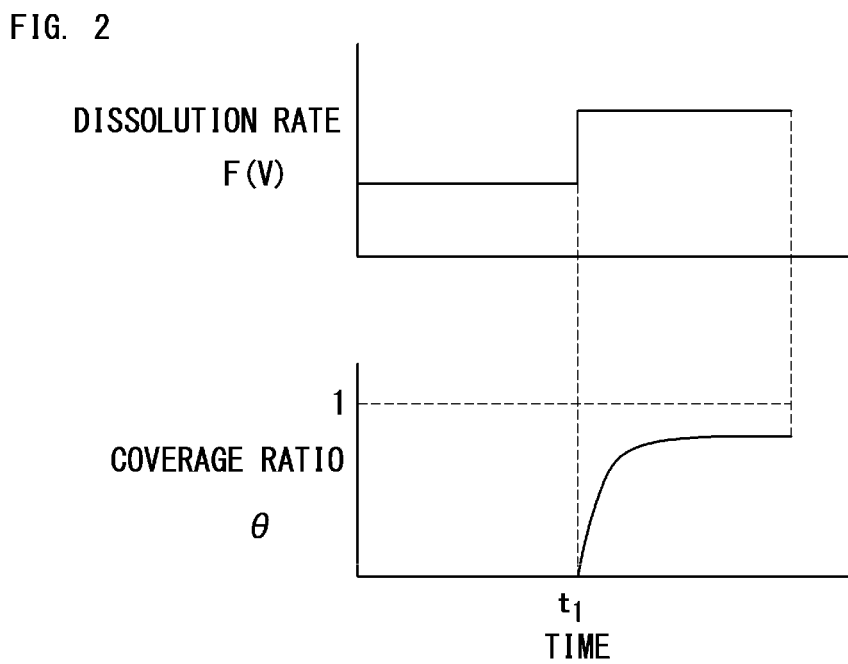
FIG. 2 is a schematic diagram of the changes over time in a dissolution rate F(V) and a coverage ratio $\theta$ when a voltage V changes stepwise.

FIG. 2 shows a schematic diagram of the changes over time in a dissolution rate $F(V)$ and a coverage ratio $\theta$ when a voltage V changes stepwise. FIG. 2 is a view drawing $F(V)$ and $\theta$ on the right side of the expression (1) in accordance with FIG. 1. As shown in the upper row of FIG. 2, the dissolution rate $F(V)$ of a catalyst increases as the voltage V increases. Meanwhile, as shown in the lower row of FIG. 2, oxide films are formed belatedly over the catalyst particle surfaces when the voltage V increases. When the oxide films are formed, the dissolution, namely the deterioration, of catalyst particles is suppressed as shown in the expression (1). It is obvious that the waveform in the lower row of FIG. 1 can be obtained from FIG. 2 and the expression (1).

The voltage V is required to be set to a target value $V_r$ with a high response in accordance with operation conditions from the viewpoint of efficiency. Meanwhile, when the voltage V becomes high response (is changed stepwise), there arises a problem that a deterioration index (dissolution rate) increases temporarily and the deterioration advances as shown in the lower row of FIG. 1. In the present invention therefore, the transient increment of a deterioration index shown with the hatching in the lower row of FIG. 1 is suppressed by using a dynamic filter.

[2.2. Simple Modeling of Transfer Characteristic]

Figure 3:
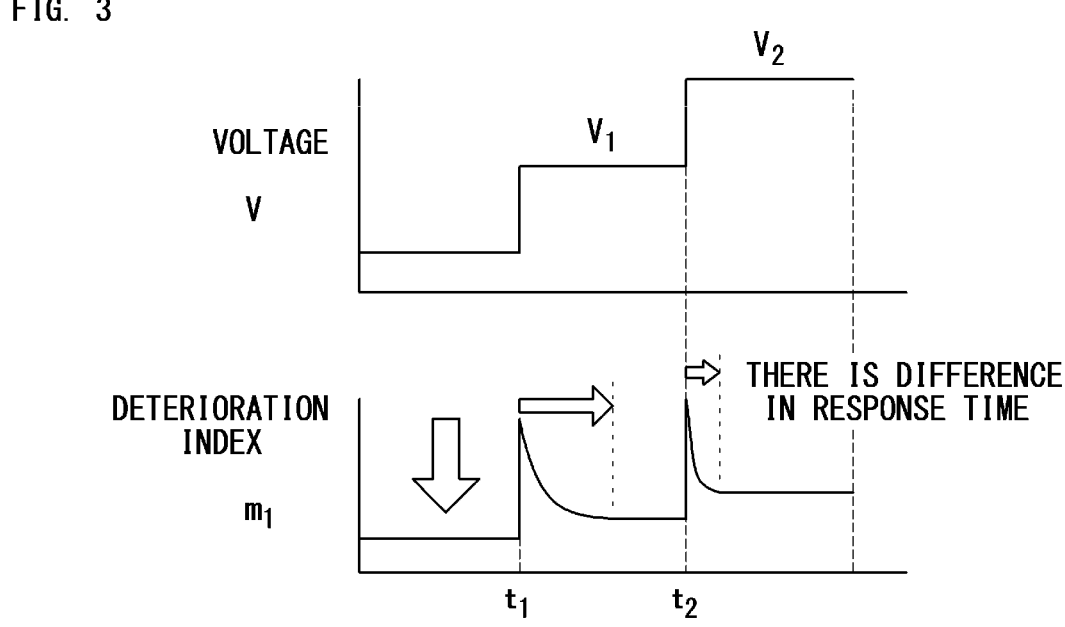
FIG. 3 is a schematic diagram of voltage dependence of transfer characteristics of catalyst particles.

FIG. 3 shows a schematic diagram of voltage dependence of transfer characteristics of catalyst particles. $F(V)$ and $\theta(V, t)$ in the right side of the expression (1) are non-linear functions (for example, refer to Reference Literature 1). It was found that the transfer characteristic $V \rightarrow m_1$ ($V \rightarrow F$, $V \rightarrow \theta$) of catalyst particles is determined depending on the value of voltage V (the value after time $t_1$ in FIG. 1) and the material properties of a catalyst as shown in FIG. 3. This means that a shape of a time series waveform (response pattern) is determined as shown in the lower row of FIG. 3 when a voltage V and the material properties of catalyst particles are determined.

[Reference Literature 1] Robert M. Darling, and Jeremy P. Meyers, "Kinetic Model of Platinum Dissolution in PEFCs," Journal of The Electrochemical Society, 150 (11), A1523-A1525 (2003)

In the present invention, modeling of a transfer characteristic is carried out through the following steps by using the above knowledge.

Step 1: to decide the material properties of a catalyst.

Step 2: to decide voltage V (voltages corresponding to $t_1$ and later in FIG. 1) at appropriate intervals within a range to be used. For example, if the lowest voltage is 0.60 V and the highest voltage is 0.90 V, voltage V=0.60, 0.65, 0.70, 0.75, 0.80, 0.85, 0.90 (V) is adopted.

Step 3: to obtain a time series waveform of a transfer characteristic ($V \rightarrow F$, $V \rightarrow \theta$) for each of the voltages decided at Step 2 and to model them. A time series waveform can be obtained by simulating a model shown in Reference Literature 1, for example.

Figure 4:
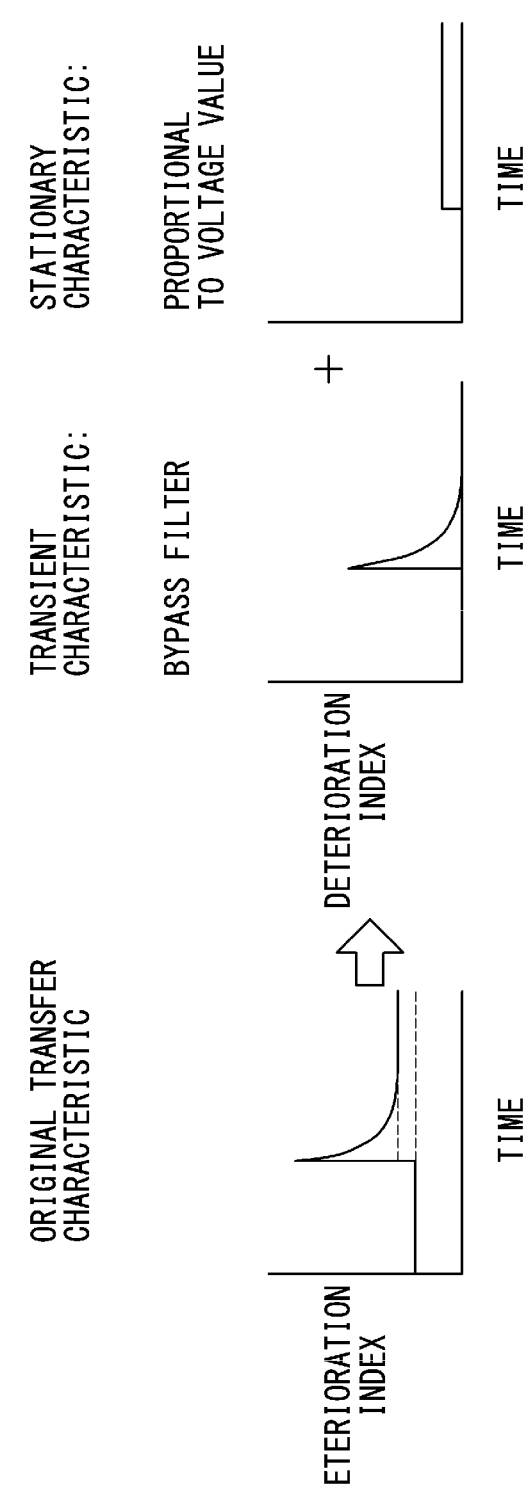
FIG. 4 is a schematic diagram of simply modeled transfer characteristics.

A method for modeling the transfer characteristic of Step 3 described above is explained hereinafter. FIG. 4 shows a schematic diagram of simply modeled transfer characteristics. In the present invention, a time series waveform of a deterioration index $m_1$ shown in the lower row of FIG. 1 is fitted with a simple transfer function. The transfer characteristic therefore is considered separately for a "transient characteristic" and a "stationary characteristic" as shown in FIG. 4.

That is, a deterioration index increases (overshoots) transiently (temporarily) when a voltage V changes. The "transient characteristic" is approximated with a high-pass filter. Further, the time series waveform of the deterioration index $m_1$ shown in the lower row of FIG. 1 also includes a "stationary characteristic" in which the deterioration index changes stepwise in accordance with the voltage V. This is expressed in a form proportional to the voltage V.

As a result, the deterioration index $m_1$ is modeled as a "transient characteristic"+a "stationary characteristic" when a voltage V is inputted. When a simple modeling expression is used in this way, a dynamic filter can be obtained easily as it will be described later.

Figure 5:
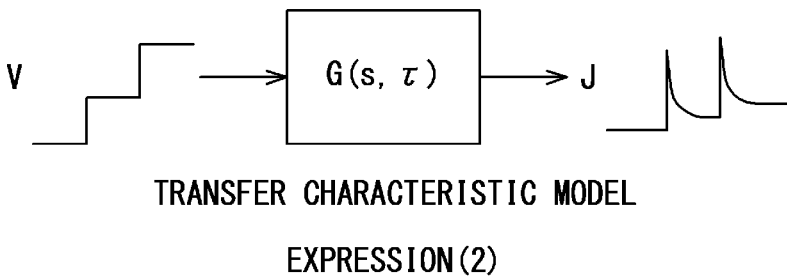
FIG. 5 is a schematic diagram of a model of a transfer characteristic (control object).

FIG. 5 shows a schematic diagram of a model of a transfer characteristic (control object). A modeling expression of a transfer characteristic (=transient characteristic+stationary characteristic) in FIG. 4 is represented by the following expression (2). The first term on the right side of the expression (2) corresponds to a transient characteristic (high-pass filter) and the second term corresponds to a stationary characteristic.

[Math. 1]

$$J = G(s, \tau) \cdot V = \left( K_m \frac{\tau \cdot s}{\tau \cdot s + 1} + K_m \right) \cdot V \tag{2}$$

Here,

J is an output of actual response (=deterioration index $m_1$), $G(s, \tau)$ is a transfer function of a model, s is a Laplacian operator, V is a voltage (or catalyst voltage), $K_m$ is a stationary gain (stationary characteristic) of a deterioration index relative to a voltage, and $\tau$ is a response speed (time constant) when catalyst particles are covered with oxide films.

[2.3. Derivation of Continuous-Time Type Dynamic Filter]

[2.3.1. Example 1]

Figure 6:
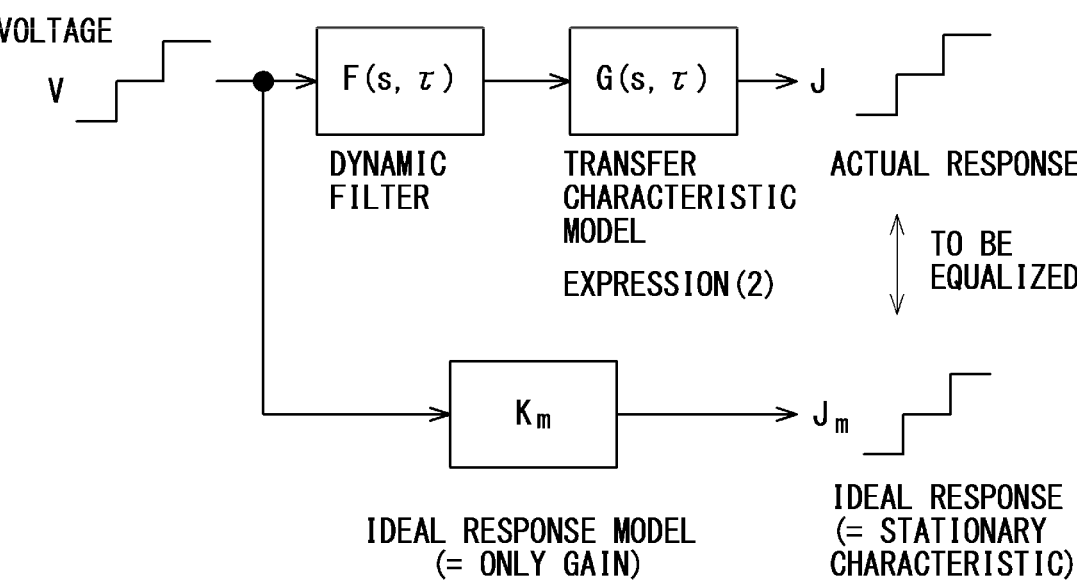
FIG. 6 is a schematic diagram of a method for suppressing the increase of a deterioration index.

FIG. 6 shows a schematic diagram of a method for suppressing the increase of a deterioration index. A method for suppressing the increase of a deterioration index in the model of a transfer characteristic (control object) of the expression (2) is explained in reference to FIG. 6.

In the upper row of FIG. 6, the value of an output of actual response J (deterioration index $m_1$) is calculated by inserting a dynamic filter $F(s, \tau)$ on the output side of a voltage V and inputting the outputted voltage value to a transfer characteristic model (expression (2)). The role of the dynamic filter is to suppress deterioration by improving the value of J, in other words, by improving a time series waveform of an input voltage V so that a time series waveform of J may be desirable (an ideal waveform).

As an example, an ideal waveform shall respond proportionally to a voltage V and the ideal response waveform shall be $J_m$ as shown in the lower row of FIG. 6. In this example, it means eliminating a transient characteristic (overshoot), and if the transient characteristic is eliminated, a deterioration index can be suppressed to a small value.

The actual response output J in the upper row and the ideal response output $J_m$ in the lower row of FIG. 6 should be equal in order to eliminate the transient characteristic and hence this derives the following expression (3). A dynamic filter $F(s, \tau)$ is represented by the expression (4) from the expression (2) and the expression (3).

$$G(s, \tau) \cdot F(s, \tau) = K_m \tag{3}$$

$$F(s,\tau) = (\tau \cdot s + 1) / (2\tau \cdot s + 1) \tag{4}$$

Actually, $\tau$ changes in response to a voltage V. When $\tau$ corresponding to a current time t is defined as "$\tau_t$", a dynamic filter $F(s, \tau)$ at a current time t is represented by the following expression (4').

$$F(s,\tau) = (\tau_t \cdot s + 1) / (2\tau \cdot s + 1) \tag{4'}$$

The coefficient of a dynamic filter represented by the expression (4) depends only on a response speed (time constant $\tau$) of coverage. The time constant $\tau$ can be obtained from not only a simulation in Reference Literature 1 but also bench experiment.

Figure 7:
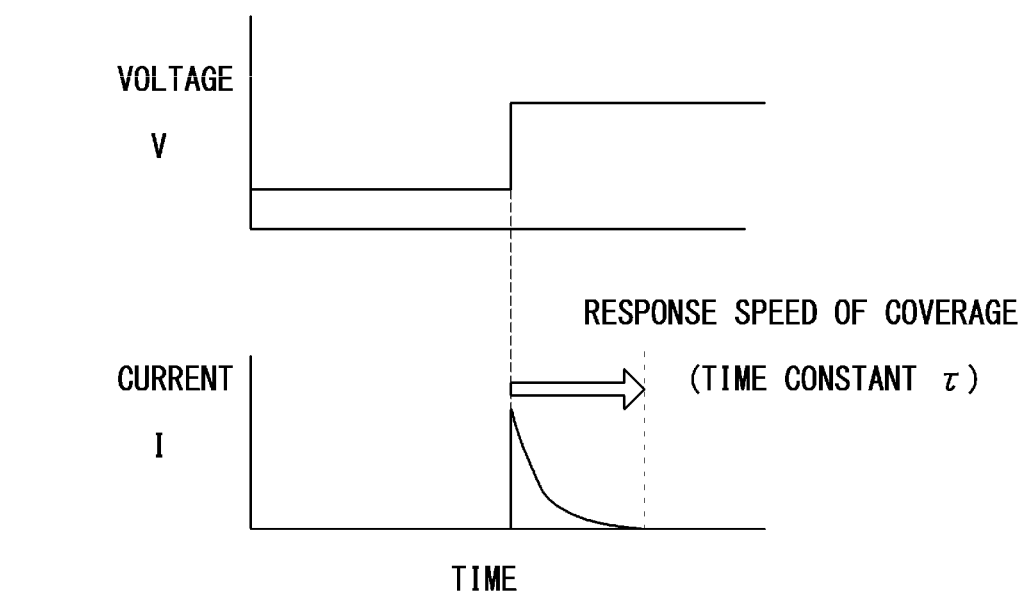
FIG. 7 is a schematic diagram of a method for measuring a response speed (time constant $\tau$) by bench experiment.

FIG. 7 shows a schematic diagram of a method for measuring a response speed (time constant $\tau$) by bench experiment. Firstly, as shown in the upper row of FIG. 7, a voltage V is inputted stepwise in a non-power generation state. Successively, as shown in the lower row of FIG. 7, a time series waveform of a current value when the voltage V is inputted stepwise is measured and a response speed (time constant $\tau$) of coverage is obtained from the waveform.

[2.3.2. Example 2]

In FIG. 6, an ideal response model is set as a "$K_m$ (proportional gain)". The ideal response model, however, is thought to contribute to deterioration suppression even though it is not "$K_m$" as long as it has such a transfer characteristic as suppress a spike.

Specifically, when a transfer function of an ideal response model is defined as "$G_m(s)$" and "$G_m(s)$" is used in place of "$K_m$" in the expression (3), the following expression (5) is obtained. Further, the expression (6) is derived from the expression (5).

$$G(s, \tau) \cdot F(s, \tau) = G_m(s) \tag{5}$$

$$F(s,\tau) = G_m(s) / G(s, \tau) \tag{6}$$

$G_m(s)$ is represented by the following expression (7.1) or (7.2), for example.

$$G_m(s) = K_m / (\tau_m \cdot s + 1) \tag{7.1}$$

Here, $\tau_m$ is a time constant of a filter ($\tau_m$ is different from the time constant $\tau$ of a model).

$$G_m(s) = K_m \cdot \omega_m^2 / \left( s^2 + 2\zeta_m \omega_m^s + \omega_m^2 \right) \tag{7.2}$$

Here, $\xi_m$ and $\omega_m$ are constants of filters.

The expression (7.1) represents a primary lag filter and the expression (7.2) represents a secondary lag filter. When $K_m$ is used as $G_m(s)$, the ideal response $J_m$ is equal to the actual response J as shown in FIG. 6. When the primary lag filter or the secondary lag filter is used as $G_m(s)$ in contrast, the ideal response $J_m$ lags behind the actual response J. When the primary lag filter or the secondary lag filter is used, however, catalyst deterioration and other requirements (for example, a fuel consumption and cell deterioration) can be weighed.

In general, if catalyst deterioration is suppressed, other requirements are deteriorated as a trade-off. At the time of design therefore, it is necessary to set which performance is emphasized. $G_m(s)$ makes such setting possible. When the response waveform of $J_m$ is made gentler than that of FIG. 6 by using the filter of the expression (7.1) or (7.2), more emphasis is placed on catalyst deterioration. On this occasion, catalyst deterioration is suppressed but a fuel consumption or a degree of cell deterioration increases in contrast.

[2.4. Mounting Method on Controller]

In order to mount a continuous-time type dynamic filter $F(s, \tau)$ on an in-vehicle controller, the continuous-time type dynamic filter $F(s, \tau)$ is changed to a discrete-time type and converted to the form of a digital filter (discrete-time type dynamic filter $F(z, \tau)$) by using Tustin transform, zero order hold, or the like. Here, z is a delay operator.

Figure 8:
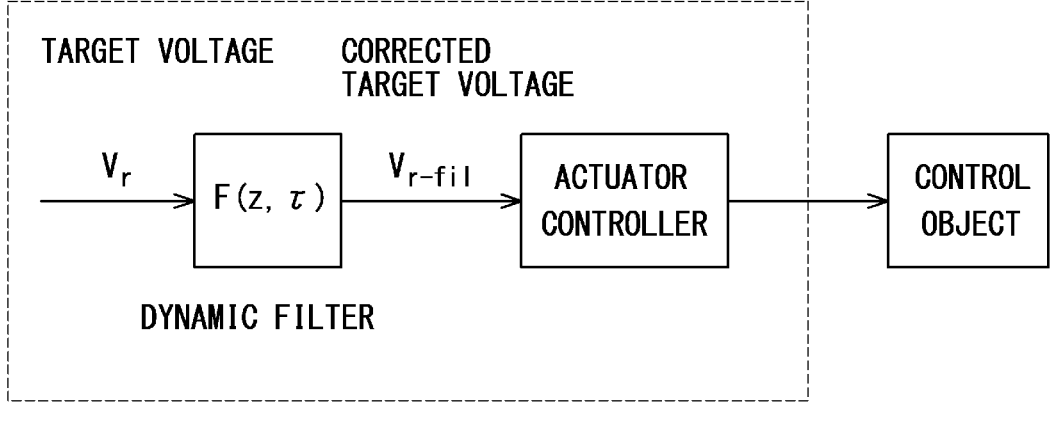
FIG. 8 is a schematic diagram of a method for mounting a catalyst deterioration suppression device according to the present invention.

FIG. 8 shows a schematic diagram of a method for mounting a catalyst deterioration suppression device according to the present invention. As shown in FIG. 8, a discrete-time type dynamic filter $F(z, \tau)$ is inserted on the output side of a target voltage $V_r$. Here, the target voltage $V_r$ is generated by an upstream controller (not shown in the figure). When $V_r$ is inputted to $F(z, \tau)$, a corrected target voltage $V_{r\text{-}fil}$ is outputted. The corrected target voltage $V_{r\text{-}fil}$ is sent to an actuator controller and a control object is controlled by the controller.

A method for converting a continuous-time type dynamic filter $F(s, \tau)$ to a discrete-time type dynamic filter $F(z, \tau)$ is explained hereinafter. There are several conversion methods. The Tustin transform of the expression (8) that is one of the conversion methods is explained here.

$$\text{Tustin transform: } s = (2/dt) \cdot (z-1)/(z+1) \tag{8}$$

Here, s is a Laplacian operator, z is a shift operator, and dt is a sampling time of discretization.

When the expression (8) is substituted for the expression (4) for organization, the expression (9) is created.

$$F(z, \tau) = \left(n_1 + n_0 \cdot z^{-1}\right) / \left(1 + d_0 \cdot z^{-1}\right) \tag{9}$$

Here, $$n_1 = (2\tau + dt)/(4\tau + dt),$$

$$n_0 = (-2\tau + dt)/(4\tau + dt), \text{ and}$$

$$d_0 = (-4\tau + dt)/(4\tau + dt).$$

In the end, the relationship between the target voltage $V_r$ and the corrected value $V_{r\text{-}fil}$ in FIG. 8 is represented by the expression (10). The expression (10) can be calculated like the expression (11) on an in-vehicle computer.

$$V_{f\text{-}fil} = F(z, \tau)V_r = \left(n_0 + n_0 \cdot z^{-1}\right) \times /V_r / \left(1 + d_0 \cdot z^{-1}\right) \tag{10}$$

$$V_{r\text{-}fil}[i] = -d_0 \cdot V_{r\text{-}fil}[i-1] + n_0 \cdot V_r[i] + n_1 \cdot V_r[i-1] \tag{11}$$

Here, i represents a discrete time and i=1, 2, 3, . . . . The coefficients $d_0$, $n_1$, and $n_0$ in the expression (11) include a time constant $\tau$ as shown in the expression (9) and hence the values of the coefficients can be changed in accordance with an output value $\tau$ in a map (FIG. 9, 11, or 12) that will be described later.

[2.5. Handling Multiple Voltages and Catalyst Material Change]

A dynamic filter $F(s, \tau)$ of the expression (4) corresponds only to a representative voltage V decided at Step 2. Time constants $\tau$ in the expression (4) for all the voltages V at Step 2 therefore are calculated and mapped beforehand. Table 1 shows an example of a map (map A) of voltages V and time constants $\tau$. By using the map A, the response speed (time constant $\tau$) of a dynamic filter is changed in accordance with a target voltage $V_r$.

TABLE 1

| Voltage V [V] | Time constant $\tau$ |
|---|---|
| 0.60 | $\tau_1$ |
| 0.65 | $\tau_2$ |
| 0.70 | $\tau_3$ |
| 0.75 | $\tau_4$ |
| 0.80 | $\tau_5$ |
| 0.85 | $\tau_6$ |
| 0.90 | $\tau_7$ |

Figure 9:
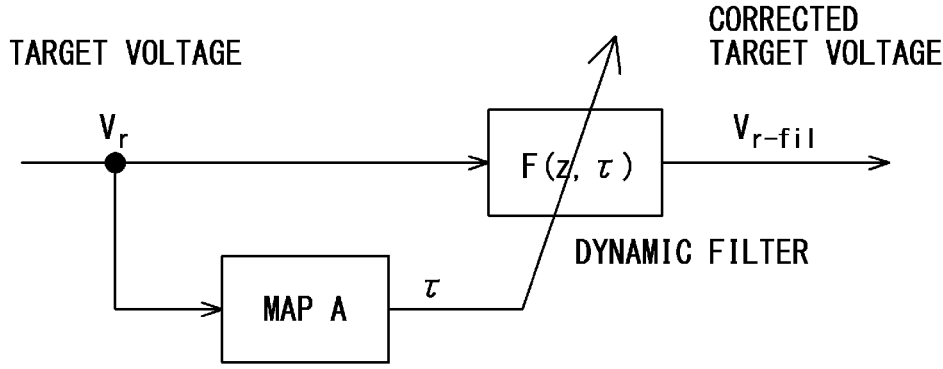
FIG. 9 is a schematic diagram of a method for handling multiple voltages.

FIG. 9 shows a schematic diagram of a method for handling multiple voltages. For example, when $V_r$ is 0.70 V at a certain time t, $\tau_3$ is read out from the map A. Successively, a dynamic filter $F(z, \tau)$ is generated by using the read-out $\tau_3$. When $V_r$ is inputted to the obtained dynamic filter $F(z, \tau)$, a corrected target voltage $V_{r\text{-}fil}$ corresponding to $V_r$ is outputted.

Otherwise, when $V_r$ is in between 0.80 and 0.85 V, $\tau_5$ and $\tau_6$ are read out from the map A and $\tau$ is linearly interpolated by using them. Successively, the linearly interpolated $\tau$ is used to generate a dynamic filter $F(z, \tau)$. $V_r$ is inputted to the obtained $F(z, \tau)$ and a corrected target voltage $V_{r\text{-}fil}$ corresponding to $V_r$ is outputted. Consequently, a wide range of voltages V can be handled.

Further, if the material of catalyst particles changes, a time constant $\tau$ also changes. Such a map A as shown in Table 1 therefore is made for each of the materials of catalyst particles beforehand. When a material of catalyst particles is changed, a time constant $\tau$ is changed by using a map A corresponding to the material. Consequently, various materials of catalyst particles can be handled.

[2.6. Handling Catalyst Deterioration]

It is known that, when catalyst particles are used under an environment of causing voltage fluctuations, a deterioration phenomenon in which the number of particles having small particle diameters reduces and inversely the number of particles having large particle diameters increases over time occurs. When such deterioration is caused, a response speed (time constant $\tau$) of coverage changes even when the voltage V is unchanged.

Figure 10:
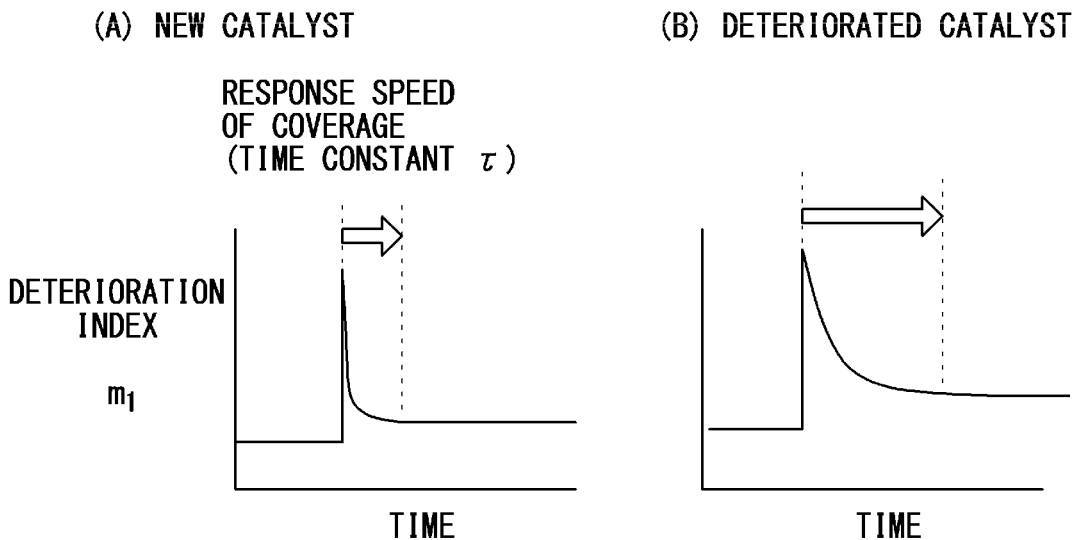
FIG. 10 is a schematic diagram of the change of a transfer characteristic when a catalyst deteriorates.

FIG. 10 shows a schematic diagram of the change of a transfer characteristic when a catalyst deteriorates. As shown in FIG. 10, the time constants $\tau$ are different between a new catalyst (FIG. 10A) and a deteriorated catalyst (FIG. 10B). If a time constant $\tau$ is estimated only by a voltage V without taking the deterioration of a catalyst into consideration therefore, the estimation accuracy of $\tau$ lowers.

Consequently, a relationship between the degree of deterioration of catalyst particles (namely, a voltage decrement $\Delta V$) and a response speed (time constant $\tau'$) after deterioration is obtained beforehand. If it is considered that the obtained $\tau'$ is the result of the time constant $\tau$ before deterioration shifted by a constant multiple due to deterioration, a relationship $\tau' = k \cdot \tau$ is obtained. The correction gain k at this time is calculated and a map B of k is made beforehand. Table 2 shows an example of a map B of the correction gain k. A response speed (time constant $\tau$) of a dynamic filter is corrected on the basis of the map B.

TABLE 2

| Voltage decrement $\Delta V$ [V] | Correction gain |
|---|---|
| 0 | 1 |
| −0.02 | $k_1$ |
| −0.04 | $k_2$ |

TABLE 2-continued

| Voltage decrement ΔV [V] | Correction gain |
| --- | --- |
| −0.06 | $k_3$ |
| −0.08 | $k_4$ |
| −0.10 | $k_5$ |

FIG. 11 shows a schematic diagram of a method for handling catalyst deterioration. For example, when ΔV is −0.02 V at a certain time t, $k_1$ is read out from the map B. Successively, τ is corrected by using the read-out $k_1$ and a dynamic filter F(z, τ) is generated by using the corrected τ. $V_r$ is inputted to the obtained F(z, τ) and a corrected target voltage $V_{r\text{-}fil}$ corresponding to ΔV is outputted.

Otherwise, when ΔV is in between −0.06 and −0.08 V, $k_3$ and $k_4$ are read out from the map B and k is linearly interpolated by using them. Successively, τ is corrected by using the linearly interpolated k and a dynamic filter F(z, τ) is generated by using the corrected τ. $V_r$ is inputted to the obtained F(z, τ) and a corrected target voltage $V_{r\text{-}fil}$ corresponding to ΔV is outputted. Consequently, catalyst deterioration can be handled.

The degree of catalyst deterioration can be grasped as the change of an I-V characteristic, for example. If deterioration advances, a voltage V that can be outputted at the same current I reduces. A relationship between the decrement ΔV and a response speed (time constant τ) is grasped by simulation or bench experiment beforehand. When the map B of Table 2 is mounted on an in-vehicle controller, the voltage decrement ΔV can be calculated on the basis of a voltage V and a current I obtained from an in-vehicle sensor (refer to FIG. 11).

[2.7. Handling Temperature and Humidity Changes]

When a temperature T of a fuel cell changes, a response speed (time constant τ) changes. A representative relationship between a temperature T and a response speed (time constant τ') after temperature change therefore is obtained beforehand. If it is considered that the obtained τ' is the result of the time constant τ before temperature change shifted by a constant multiple, a relationship τ'=p·τ is obtained. The correction gain p is calculated and a map C of p is made beforehand. Table 3 shows an example of a map C of the correction gain p. In Table 3, −50° C., −25° C., 0° C., 30° C., 60° C., and 120° C. are set as the representative temperatures.

TABLE 3

| Temperature T [° C.] | Correction gain |
| --- | --- |
| −50 | $p_1$ |
| −25 | $p_2$ |
| 0 | $p_3$ |
| 30 | $p_4$ |
| 60 | $p_5$ |
| 90 | $p_6$ |
| 120 | $p_7$ |

The same applies to humidity. That is, if a humidity RH of a fuel cell changes, a response speed (time constant τ) changes. A representative relationship between a humidity RH and a response speed (time constant τ') after humidity change therefore is obtained beforehand. If it is considered that the obtained τ' is the result of the time constant τ before humidity change shifted by a constant multiple, a relationship τ'=r·τ is obtained. The correction gain r is calculated and a map D of r is made beforehand. Table 4 shows an example of a map D of the correction gain r. In Table 4, 0% RH, 25% RH, 50% RH, 75% RH, and 100% RH are set as the representative humidities.

TABLE 4

| Humidity RH [%] | Correction gain |
| --- | --- |
| 0 | $r_1$ |
| 25 | $r_2$ |
| 50 | $r_3$ |
| 75 | $r_4$ |
| 100 | $r_5$ |

Figure 12:
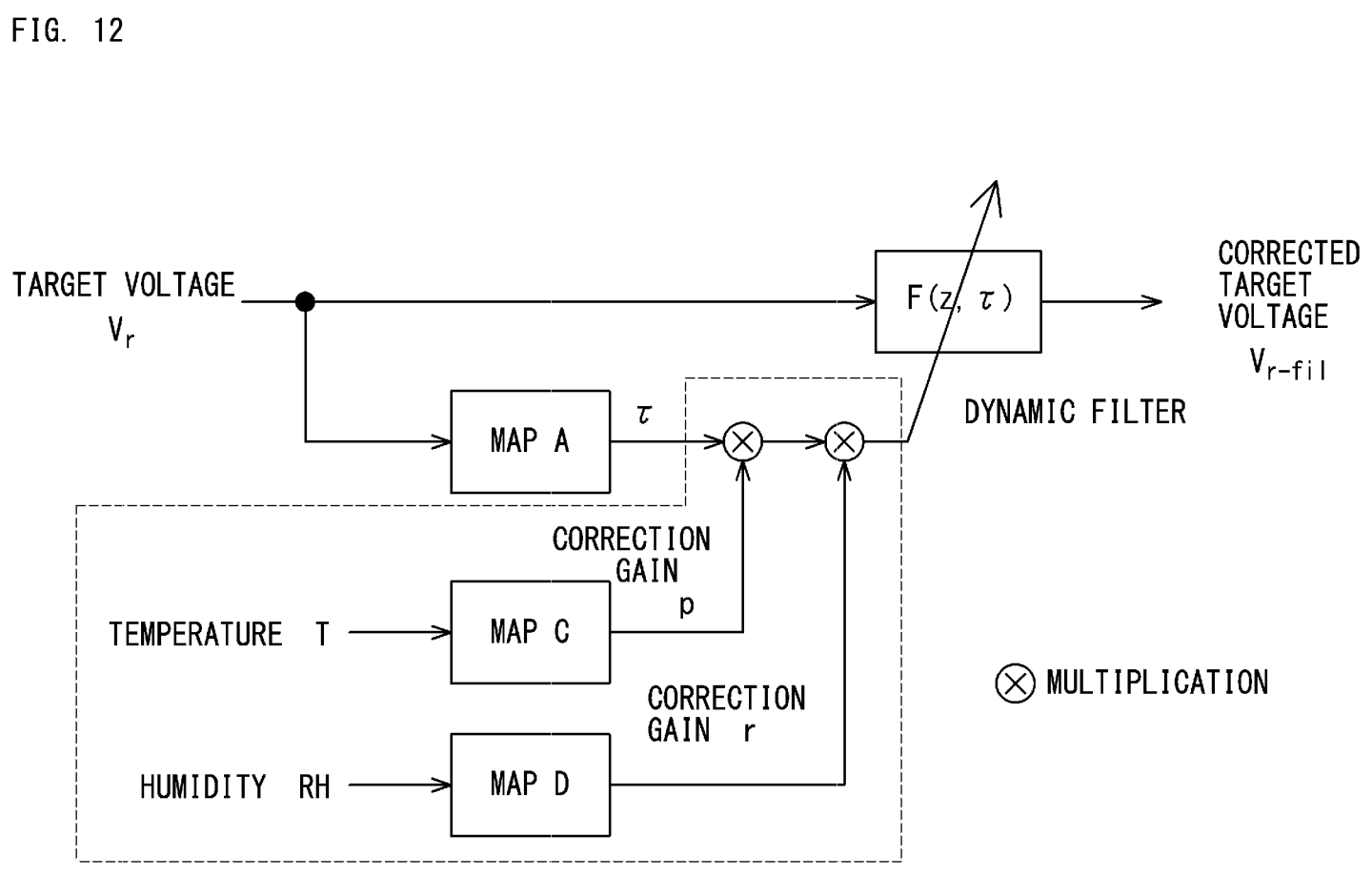

FIG. 12 shows a schematic diagram of a method for handling temperature change and/or humidity change. A temperature T is measured and a correction gain p corresponding to the temperature T is read out from a map C. In place of this or in addition to this, a humidity RH is measured and a correction gain r corresponding to the humidity RH is read out from a map D. Successively, τ is corrected by using the read-out p and/or r and a dynamic filter F(z, τ) is generated by using the corrected τ. $V_r$ is inputted to the obtained dynamic filter F(z, τ) and a corrected target voltage $V_{r\text{-}fil}$ corresponding to ΔV is outputted. Consequently, wide ranges of temperature and humidity conditions can be handled.

3. EFFECTS

Figure 13:
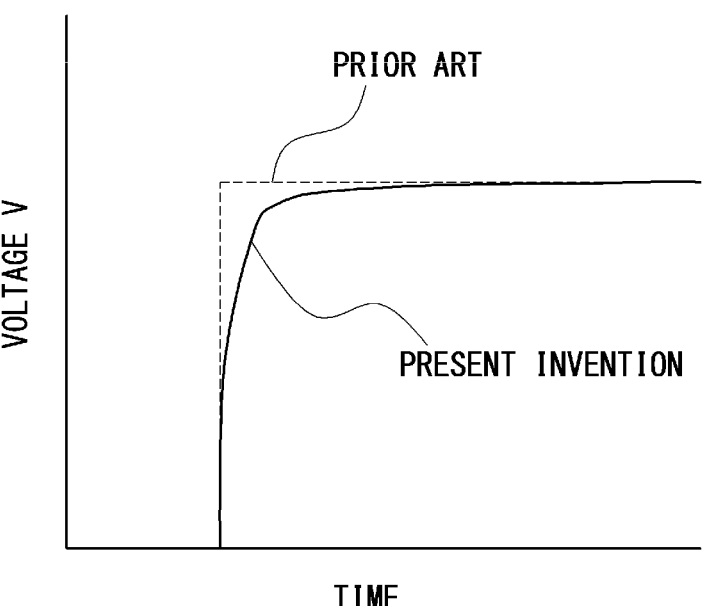
FIG. 13 is a schematic diagram of voltage change during transient time.

FIG. 13 shows a schematic diagram of voltage change during a transient time. As shown in FIG. 13, a change rate of a rising part of a catalyst voltage slows down further than a prior art by a simply configured dynamic filter in the present invention. As a result, it is possible to prevent a deterioration index shown in FIG. 1 from being temporarily increased (the hatched region) and hence the deterioration of a catalyst can be suppressed.

Meanwhile, the delay of a voltage value causes fuel efficiency to deteriorate but, in the present invention, a filter is configured so as to minimize voltage delay (in other words, so as to suppress only the hatched part in FIG. 1) and hence the deterioration of fuel efficiency can be minimized. Consequently, in the present invention, it is possible to generate a voltage value in which the deterioration of fuel efficiency is suppressed to minimum while the deterioration of a catalyst is suppressed.

Further, although examples of changing a target voltage stepwise have heretofore been shown, the present invention can also be applied to an arbitrarily changing target voltage.

Embodiments according to the present invention have heretofore been explained in detail but the present invention is not limited to the above embodiments at all and can be changed variously in the range not deviating from the tenor of the present invention.

A catalyst deterioration suppression device according to the present invention can be used for the output control of a fuel cell system having various fuel cells.

What is claimed is:

1. A catalyst deterioration suppression device comprising:
    first means for obtaining a voltage V (= catalyst voltage $V_{cat}$) of a fuel cell as a variable to estimate a response speed (time constant τ) at which a coverage ratio of an oxide film of catalyst particles contained in a cathode of the fuel cell changes;
    second means for reading out a time constant $τ_t$ corresponding to the voltage V at a current time t from a pre-made map A representing a relationship between the voltage V and the time constant τ and corresponding to the catalyst particles;

third means for generating a continuous-time type dynamic filter F(s, τ) by using the time constant τ_r, converting the continuous-time type dynamic filter F(s, τ) to a discrete-time type dynamic filter F(z, τ), and mounting the discrete-time type dynamic filter on an in-vehicle controller provided in a vehicle; and fourth means for inputting a target voltage V_r to the discrete-time type dynamic filter F(z, τ) and outputting a corrected target voltage V_{r-fil} to an actuator controller provided in the vehicle.

2. The catalyst deterioration suppression device according to claim 1, wherein the dynamic filter F(s, τ) is represented by the following expression (4) or (6), $$F(s, \tau) = (\tau \cdot s + 1)/(2\tau \cdot s + 1) \qquad (4)$$

here, s is a Laplacian operator, $$F(s, \tau) = G_m(s)/G(s, \tau) \qquad (6)$$

here, $G_m(s)$ is a transfer function of an ideal response model and G(s, τ) is a transfer function of a model.

3. The catalyst deterioration suppression device according to claim 1, wherein the first means further includes:

(a) means A for obtaining an interterminal voltage $V_{cell}$, a current I, and a resistance value R of the fuel cell and calculating the voltage V from a relational expression V=Vcell+IR;

(b) means B for obtaining $V_{cell}$, substituting $V_{cell}$ in a previously obtained relational expression $V=f(V_{cell})$ between $V_{cell}$ and the voltage V, and estimating the voltage V; or (c) means C for installing a reference electrode at a cathode side catalyst layer in the fuel cell in advance and actually measuring the voltage V by using a potential difference between the reference electrode and a cathode side current collector.

4. The catalyst deterioration suppression device according to claim 1, wherein the first means includes means for obtaining a voltage decrement ΔV as another variable;

the second means includes means for reading out a correction gain $k_t$ corresponding to the voltage decrement ΔV at a current time t from a pre-made map B representing a relationship between the voltage decrement ΔV and a correction gain k of the time constant τ and corresponding to the catalyst particles and multiplying the time constant τ by the correction gain $k_t$; and the third means includes means for generating the continuous-time type dynamic filter F(s, τ) by using the time constant τ corrected by the correction gain $k_t$ and converting the continuous-time type dynamic filter F(s, τ) to the discrete-time type dynamic filter F(z, τ).

5. The catalyst deterioration suppression device according to claim 1, wherein the first means includes means for obtaining a temperature T of the fuel cell as another variable;

the second means includes means for reading out a correction gain $p_t$ corresponding to the temperature T at a current time t from a pre-made map C representing a relationship between the temperature T and a correction gain p of the time constant τ and corresponding to the catalyst particles and multiplying the time constant τ by the correction gain $p_t$; and the third means includes means for generating the continuous-time type dynamic filter F(s, τ) by using the time constant τ corrected by the correction gain $p_t$ and converting the continuous-time type dynamic filter F(s, τ) to the discrete-time type dynamic filter F(z, τ).

6. The catalyst deterioration suppression device according to claim 1, wherein the first means includes means for obtaining humidities RH of gasses supplied to the cathode and an anode of the fuel cell respectively as another variable;

the second means includes means for reading out a correction gain $r_t$ corresponding to the humidity RH at a current time t from a pre-made map D representing a relationship between the humidity RH and a correction gain r of the time constant τ and corresponding to the catalyst particles and multiplying the time constant τ by the correction gain $r_t$; and the third means includes means for generating the continuous-time type dynamic filter F(s, τ) by using the time constant τ corrected by the correction gain $r_t$ and converting the continuous-time type dynamic filter F(s, τ) to the discrete-time type dynamic filter F(z, τ).

7. The catalyst deterioration suppression device according to claim 1, wherein the first means includes means for obtaining a voltage decrement ΔV as another variable, the voltage decrement ΔV being a difference between an initial state voltage $V_0$ and a voltage $V_t$ after used for t hours $(=V_t-V_0)$ at a reference current $I_0$, a correction gain value $k_t$ is read from a pre-made map B different from the pre-made map A based on the voltage decrement ΔV, and the time constant $T_t$ read from the pre-made map A is multiplied by the correction gain value $k_t$ read from the pre-made map B to obtain corrected time constant τ.

* * * * *